UNITED STATES PATENT OFFICE.

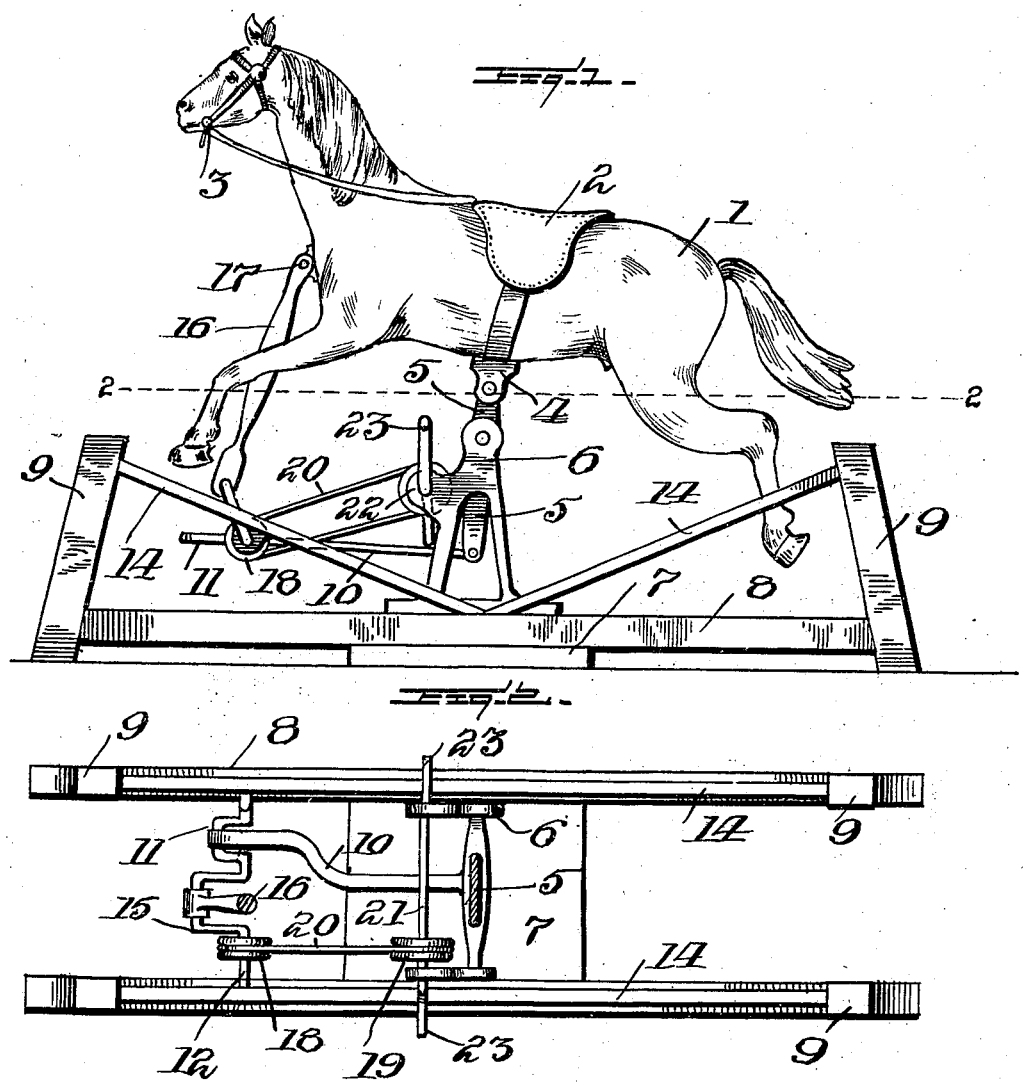

JOSEPH SENG, OF ALLEGHENY, PENNSYLVANIA.

HOBBY-HORSE.

SPECIFICATION forming part of Letters Patent No. 710,218, dated September 30, 1902.

Application filed July 7, 1902. Serial No. 114,564. (No model.)

*To all whom it may concern:*

Be it known that I, JOSEPH SENG, a citizen of the United States of America, residing at Allegheny, in the county of Allegheny and State of Pennsylvania, have invented certain new and useful Improvements in Hobby-Horse Toys, of which the following is a specification, reference being had therein to the accompanying drawings.

This invention relates to certain new and useful improvements in hobby-horse toys, and has for its object to provide a hobby-horse which will produce the motion of a running horse.

Another object of my invention is to provide a toy which will resemble a horse and connect thereto mechanism which will give the horse a rocking movement, the mechanism being operated by a child or person riding the horse.

A still further object of my invention is to provide a toy which may be operated by a child riding the horse or may be made of a smaller size and operated by hand.

A still further object of my invention is to provide a toy which will be simple in construction, strong, durable, comparatively inexpensive to manufacture, and one which can be readily used by the smallest child.

With the above and other objects in view the invention consists in the novel construction, combination, and arrangement of parts to be hereinafter more fully described, and specifically pointed out in the claim.

In describing the invention in detail reference is had to the accompanying drawings, forming a part of this specification, and wherein like numerals of reference indicate like parts throughout both views, in which—

Figure 1 is a side elevation of my improved hobby-horse. Fig. 2 is a section on line 2 2 of Fig. 1.

In the drawings the reference - numeral 1 indicates a horse, which carries a saddle 2 and a bridle 3. Secured to the girth of the saddle is the lug 4, in which is pivoted the link 5, said link being carried by the frame 6, which is mounted upon a suitable framework 7, said framework consisting of the side bars 8 and the end posts 9. To the lower end of the link 5 is attached the crank 10, the other end of said crank being connected to the U-shaped crank 11, carried by the shaft 12, which is mounted upon the side bars 14 of the framework 7. This shaft 12 carries a similar U-shaped crank 15, to which is loosely secured the bar 16, which has its forward end secured to the breast of the horse, as indicated at 17.

The reference-numeral 18 represents a pulley carried by the shaft 12, said pulley being connected to a large pulley 19 by means of the belt 20. This pulley 19 is mounted upon a shaft 21, which is carried by the projection 22, formed integral with the framework 6. To the outer ends of this shaft are formed the cranks 23, which are operated or revolved by the rider of the horse.

The operation of my improved toy is as follows: It being desired to operate my improved hobby-horse, the same is accomplished by mounting the steed and placing the feet upon the cranks 23, when the motion similar to that when riding a bicycle is employed, thus rotating the shaft 21, carrying the pulley 19, which imparts a rotary movement to the shaft 12, which carries the bar 15, when the forward part of the horse will be raised and lowered and the crank 10 will operate the link 5, giving the same a backward-and-forward motion, which in turn will impart a similar movement to the horse. It will be noted that the horse may be given this motion by operating the cranks 23 by hand, as will be the case when the same is made of a diminutive size.

It will be noted that various changes may be made in the details of construction without departing from the general spirit of my invention.

Having fully described my invention, what I claim as new, and desire to secure by Letters Patent, is—

A hobby-horse mounted within a suitable framework, said framework carrying an auxiliary frame, a link mounted within said frame and connecting to the girth of the horse, a crank connected to the opposite end of said link, said crank having its other end pivotally secured to a shaft carried by the main framework, a bar connected to said shaft, the other end of said bar being pivotally connected to the forward end of the horse, a pulley carried by last-named shaft and connecting to a shaft carried by the auxiliary framework, said shaft carrying cranks on its outer end, a pulley mounted upon the last-named shaft, said pulley connecting to the first-named pulley by a suitable belting, substantially as described and for the purpose set forth.

In testimony whereof I affix my signature in the presence of two witnesses.

JOSEPH SENG.

Witnesses:
JOHN NOLAND,
E. E. POTTER.